G. C. RALSTON.
APPARATUS FOR DISCHARGING REFUSE FROM SHIPS.
APPLICATION FILED DEC. 5, 1908.
1,133,503.
Patented Mar. 30, 1915.
8 SHEETS—SHEET 3.
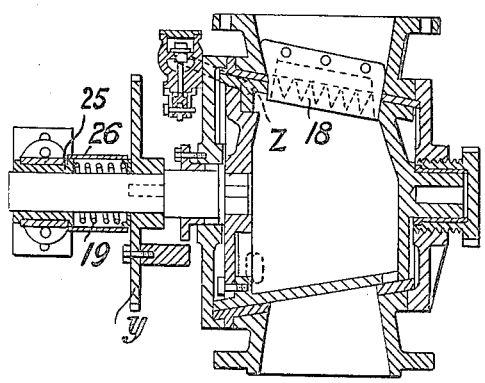
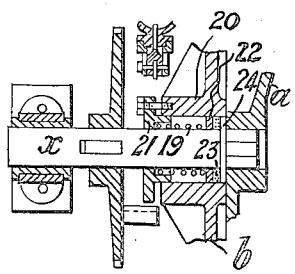
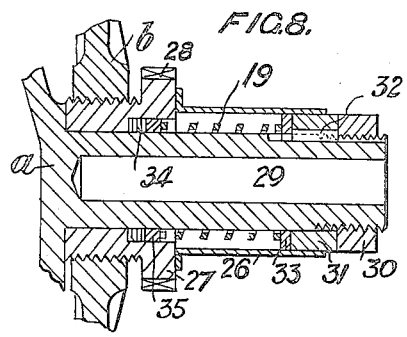
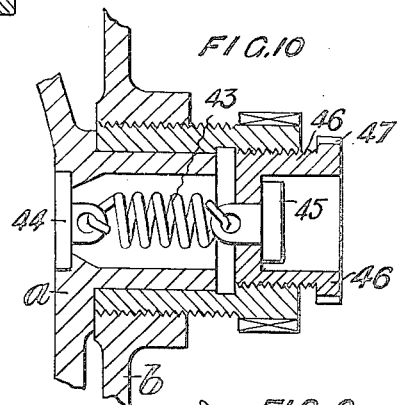
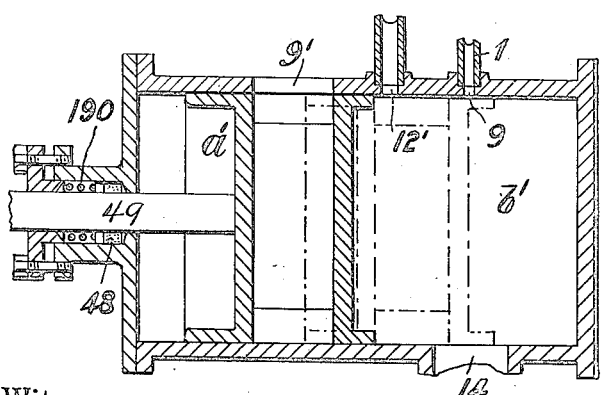
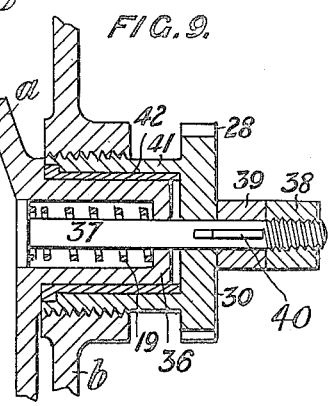
Witnesses.
Inventor.
Gavin Carlyle Ralston G. C. RALSTON.
APPARATUS FOR DISCHARGING REFUSE FROM SHIPS.
APPLICATION FILED DEC. 5, 1908.

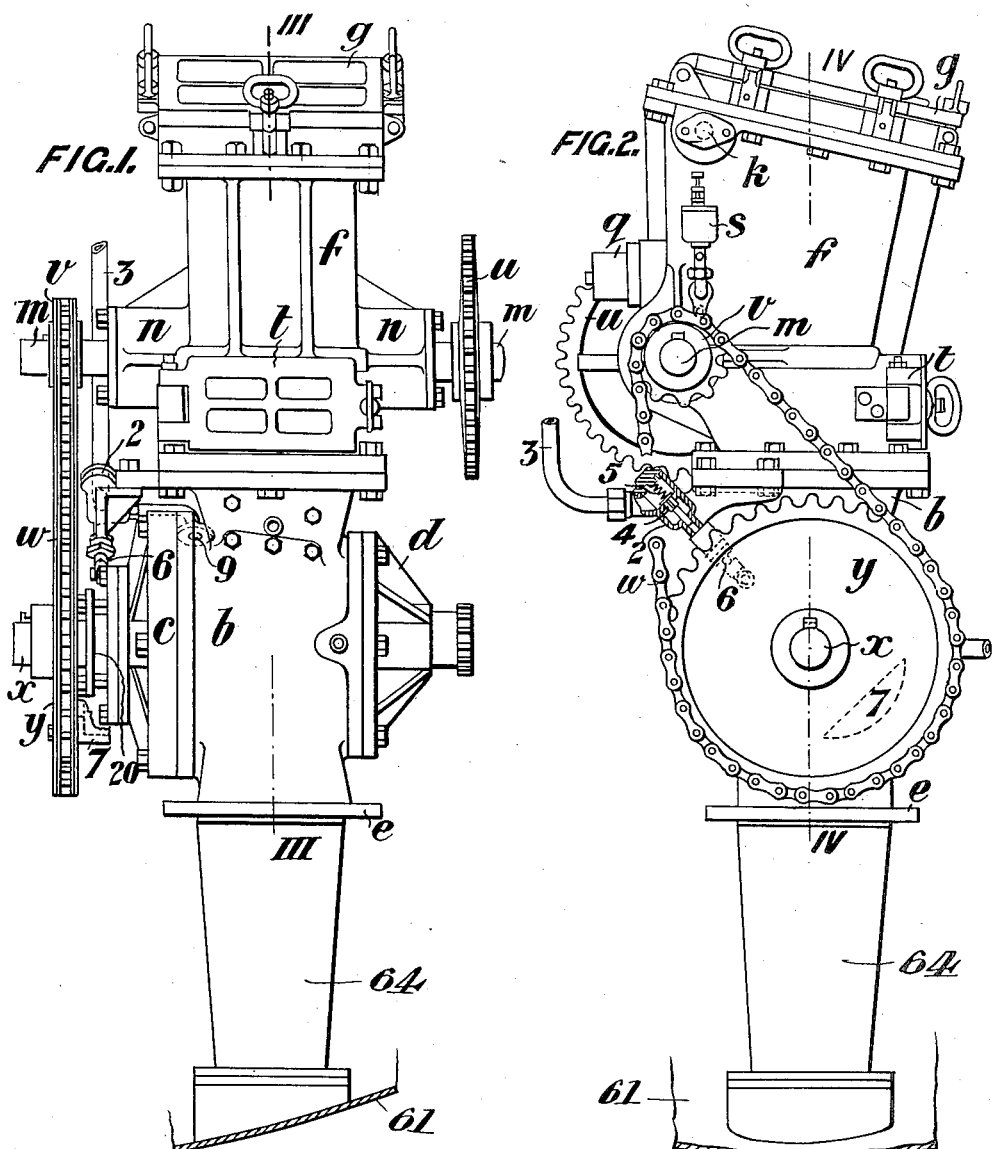

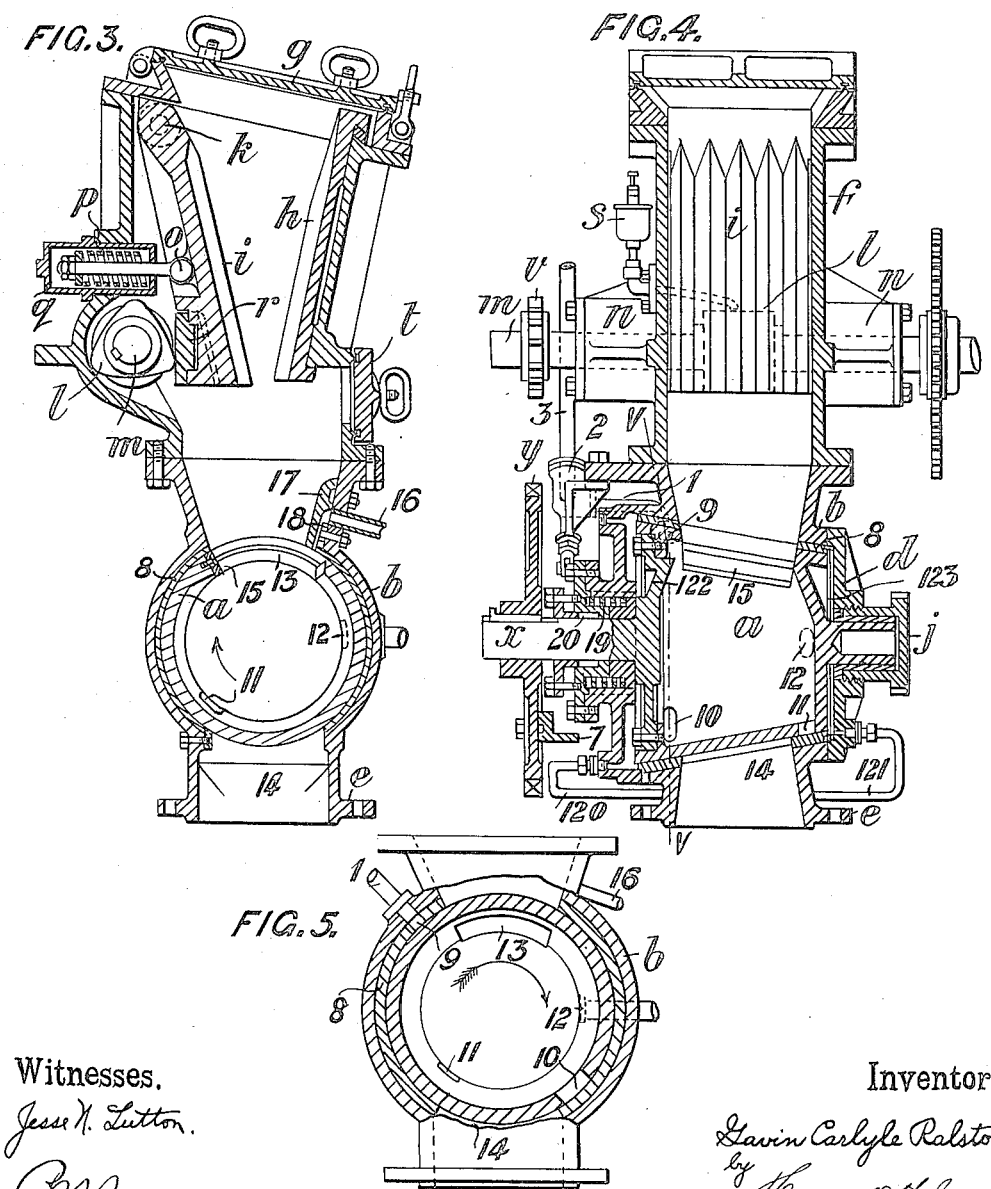

1,133,503.

Patented Mar. 30, 1915.
8 SHEETS—SHEET 4.

Witnesses.
Jesse N. Lutton.

Inventor.
Gavin Carlyle Ralston

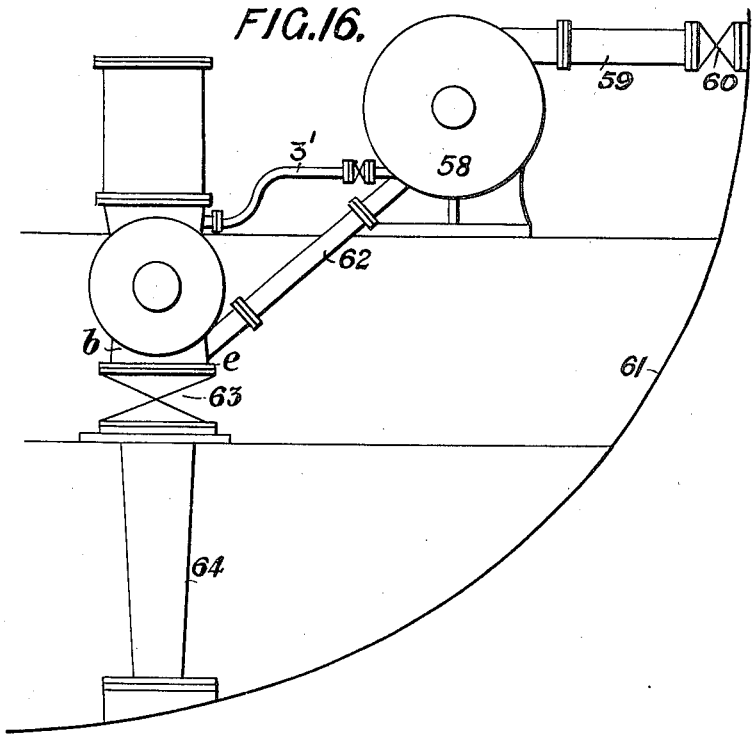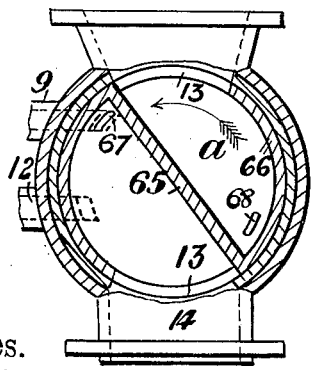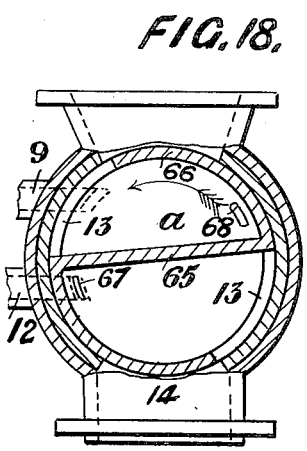

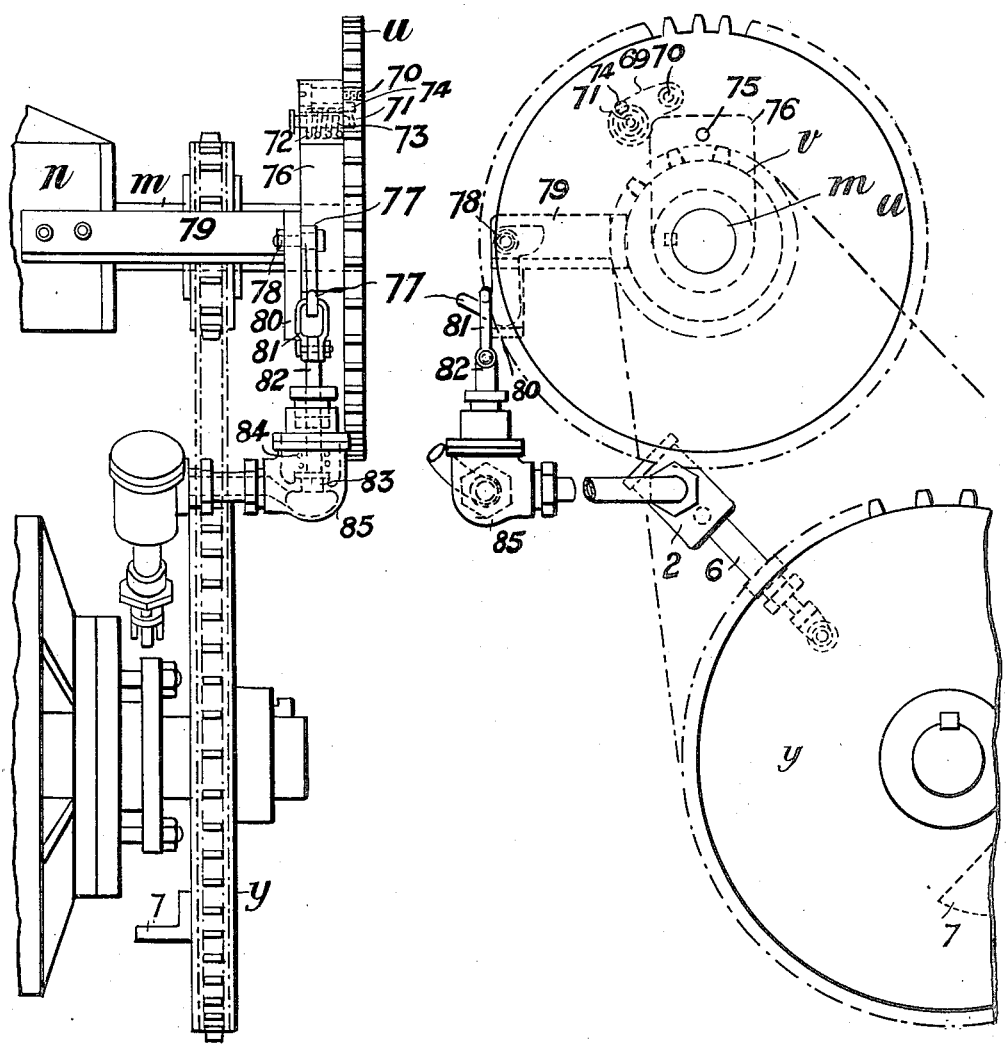

G. C. RALSTON.
APPARATUS FOR DISCHARGING REFUSE FROM SHIPS.
APPLICATION FILED DEC. 5, 1908.
1,133,503.
Patented Mar. 30, 1915.
8 SHEETS—SHEET 7.
FIG. 22.
FIG. 21.
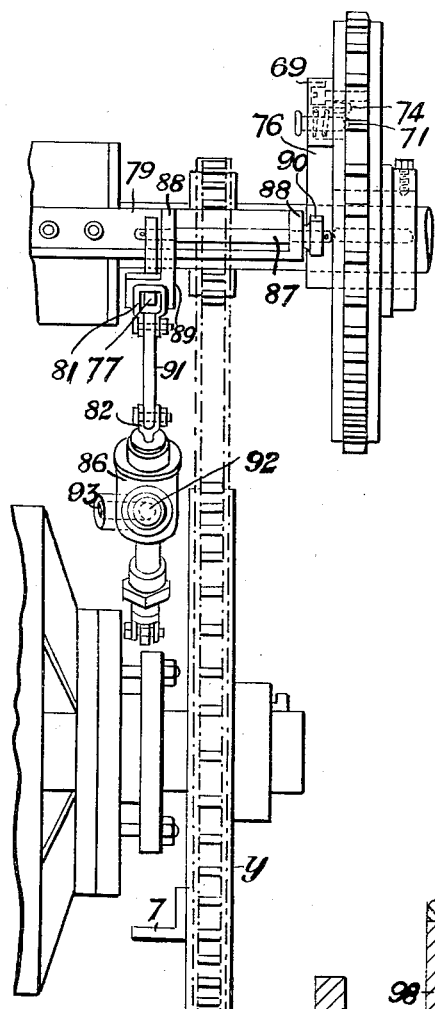
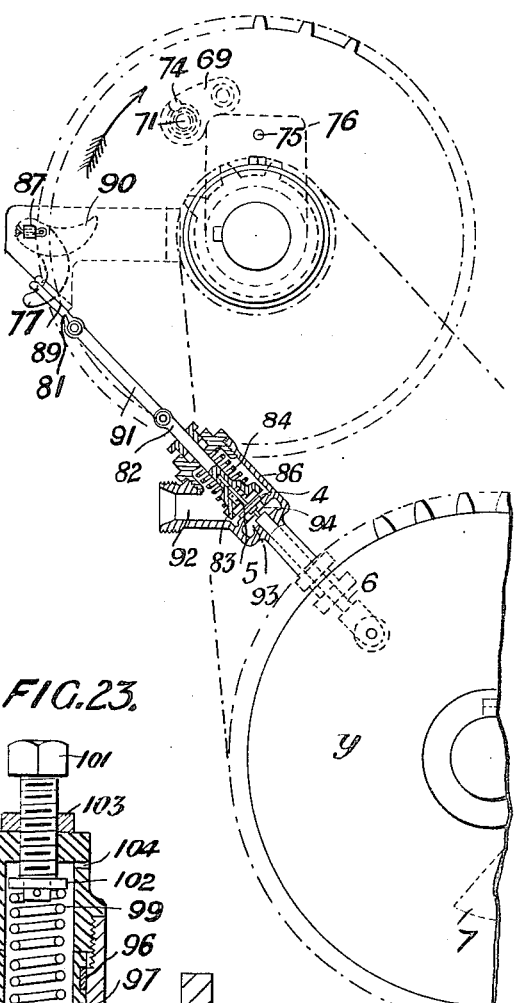
FIG. 23.
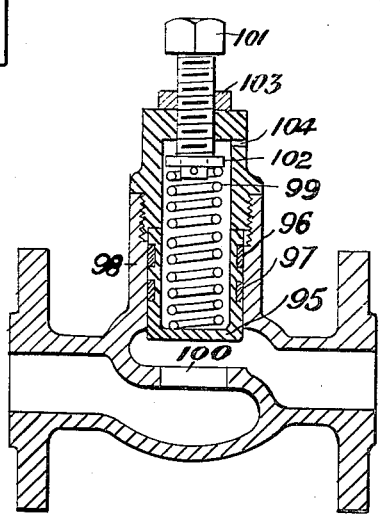
Witnesses.
Jesse N. Sutton
B. Dommers
Inventor.
Gavin Carlyle Ralston
by Henry Orth Jr
atty

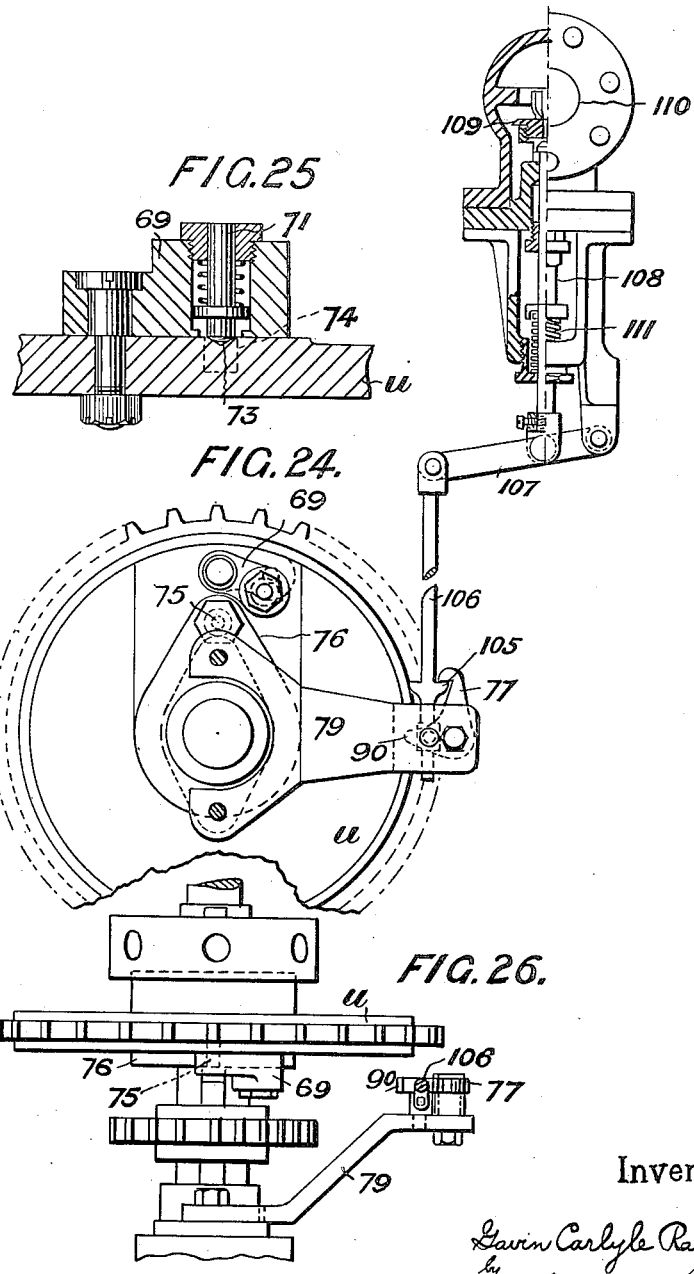

UNITED STATES PATENT OFFICE.

GAVIN CARLYLE RALSTON, OF LEE, ENGLAND, ASSIGNOR TO J. STONE & COMPANY, LIMITED, OF DEPTFORD, ENGLAND.

APPARATUS FOR DISCHARGING REFUSE FROM SHIPS.

1,133,503.   Specification of Letters Patent.   Patented Mar. 30, 1915.

Application filed December 5, 1908. Serial No. 466,097.

*To all whom it may concern:*

Be it known that I, GAVIN CARLYLE RALSTON, a subject of the King of Great Britain, residing at "Cleveland," Leyland Road, Lee, in the county of Kent, England, have invented new and useful Improvements in Apparatus for Discharging Refuse from Ships, of which the following is a specification.

This invention relates to improvements in apparatus for expelling or discharging ashes, ballast water, bilge water and other materials from ships and other places by means of compressed air or other fluid, of the type in which the ashes are crushed and then passed into a space such as the interior of a cock or valve or into a space or port in a piston reciprocating in a cylinder which space is also supplied by at set times or periodically with a charge of compressed air or other expelling fluid so that the ashes or the like are discharged from such chambered plug or piston by the pressure fluid into the sea or other place, and the invention has for its object to simplify the construction, to improve or facilitate the working of such apparatus, to prevent leakage of compressed air or other fluid, to lessen the wear on the working parts by preventing as far as possible ashes or other foreign matter from penetrating between working faces of the apparatus, to double the number of discharges for each revolution of the plug and to lubricate the latter.

Figure 12:
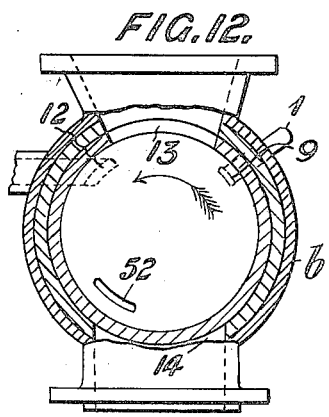
Figure 13:
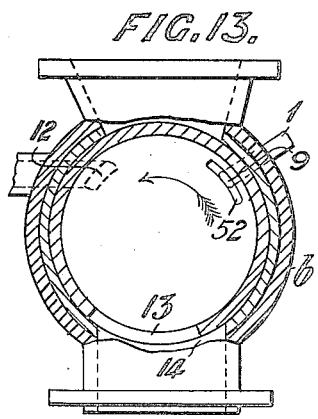
Figure 15:
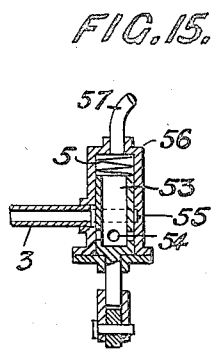
Figure 14:
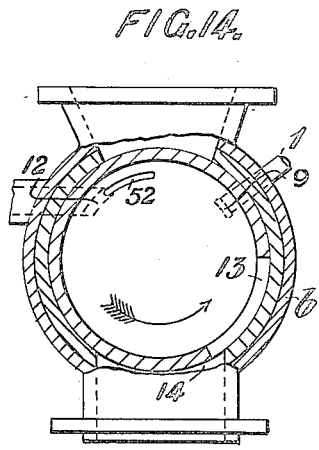

Figure 1 of the accompanying drawings is a front elevation of an apparatus constructed according to this invention. Fig. 2 is an end view thereof partly in elevation and partly in section. Fig. 3 is a section on the line III—III Fig. 1. Fig. 4 is a section on the line IV—IV Fig. 2 and Fig. 5 is a section on the line V—V Fig. 4. Fig. 6 is a sectional elevation to an enlarged scale of a part of a similar apparatus intended to more particularly illustrate the elastic means for pressing the plug home in its casing. Fig. 7 is a similar detail view of a modification. Fig. 8 is a similar detail view showing the application of a spring to the small end of the plug and Figs. 9 and 10 are similar detail views of modified constructions. Fig. 11 is a sectional elevation of a modified construction of ash expeller provided with a reciprocating piston in a cylinder or casing and adapted to permit of exhausting air from the discharge pipe and also from the space in the piston just before the latter is in position to receive a fresh charge of ashes or the like. Fig. 12 is a transverse sectional elevation of the barrel or casing with a plug therein in position for the reception of a charge and Figs. 13 and 14 are similar views with the plug in such positions as to permit of the commencement of the discharge and to allow the exhaust port in the plug to register with the exhaust port in the casing respectively. Fig. 15 is a detail sectional view showing a piston valve adapted to open and close the supply of compressed fluid. Fig. 16 is a more or less diagrammatic end elevation of a modified form of apparatus. Fig. 17 is a transverse sectional elevation of a plug so divided as to permit of two dicharges for each revolution and in the position for taking in a charge in one compartment and for discharging from the other compartment. Fig. 18 is a similar view but showing the plug in position for exhausting. Fig. 19 is a detail end elevation showing means for permitting the apparatus to stop and to cut off the pressure fluid supply by means of a special valve for that purpose in case the apparatus should become jammed, and Fig. 20 is a rear elevation thereof while Fig. 21 is a detail end elevation of a modification in which the same valve casing for containing the valve to admit pressure fluid to expel the charge and operated by the cam or other moving part also contains the valve for cutting off pressure fluid supply in case of a jamming or breakage of a part of the apparatus. Fig. 22 is a rear elevation thereof. Fig. 23 is a sectional elevation of a valve adapted to close automatically when the pressure falls a certain amount. Fig. 24 is a sectional side elevation of a modification of the devices seen in Figs. 19 to 22 but showing how the shearing of a pin may bring about the stoppage of the engine or motor driving the pump which supplies the expeller. Fig. 25 is a cross section of the cam 69 and of portion of the wheel $u$, and Fig. 26 is a plan of part of Fig. 24.

Referring more particularly to Figs. 1 to 5 the plug $a$ of the cock or valve which is of the taper type and which is as usual made hollow, is adapted to rotate freely in a correspondingly formed casing $b$ provided with covers $c$ and $d$, one at each end. The lower end of the casing is flanged and may be bolted or fastened near to the bottom of the ship, but in the case of vessels with double bottoms, or where it is inconvenient to mount the apparatus close to the bottom of the ship, a length of pipe (hereinafter called the discharge pipe and shown for instance marked 64 in Fig. 16) intervenes between the flanged base $e$ of the casing and the bottom of the vessel. On top of the casing $b$ is mounted a hopper $f$ with a water-tight cover $g$ of well known construction and inside of this hopper there is a fixed serrated jaw $h$ and a movable jaw $i$ mounted on a pin or pivots $k$ and adapted to oscillate by means of a multiple cam $l$ mounted on a shaft $m$ revolving in bearings $n$ at each end of the hopper in such manner that the movable jaw oscillates three times (in this particular example) for every revolution of the shaft $m$ and in order that the movable jaw shall closely follow the contour of the cam it is provided with a hinged rod $o$ having a washer, a nut and a lock nut and a spring $p$ working in an inclosed casing $q$ the movable jaw being suitably provided with a removable wearing piece or abutment $r$ against which the cam takes. If desired crushing rollers may be used in addition to or in lieu of the crushing jaws or alternatively a grating to regulate the size of the material passing through, or both may be employed. In order to lubricate the cam the hopper is suitably provided with a lubricator $s$ and there is an inspection door $t$. The cam shaft $m$ is suitably driven by a chain and a sprocket wheel $u$ from the engine or otherwise in any convenient manner and the other end of the said shaft has keyed thereto a sprocket wheel $v$ which by a chain $w$ communicates motion to the stem or shaft $x$ of the plug $a$ by a sprocket wheel $y$ to cause the latter to revolve. The casing is provided with an inlet port 9 for compressed air or other fluid, indicated in Figs. 1, 4 and 5 which port by a pipe 1 communicates with an additional valve 4 outside of the casing $b$, which valve has for its object to entirely cut off the compressed air or other fluid supply to the plug valve $a$, thereby preventing leakage around the plug $a$ except when the supply of compressed fluid is required to expel the charge. The said valve is best seen in Fig. 2 and it comprises a casing 2 connected to the air pipe 3 from the compressed air reservoir (not shown) and contains a mushroom valve 4 or equivalent valve having a spring 5 which always tends to keep it on its seat or the top of the casing may have a ledge or abutment to limit the lift of the valve. The latter is provided with a stem 6 guided in and passing out of the casing 2, the other end of which stem has a roller or bowl, while the sprocket wheel $y$ is provided with a cam 7 which as the wheel revolves is adapted to come into contact with the roller at the end of the valve stem and so causes the valve to lift in the example shown against the action of the spring 5. The said spring is not actually necessary but it insures the definite closure of the valve when the cam in its revolution releases the valve stem, and renders the opening of the valve elastic or soft and presses the valve stem against the cam. The casing $b$ may be made of cast iron or other suitable metal and may have an inner lining 8 of steel or other hard metal and the plug $a$ may be of such hard metal or of a metal different from that of the casing. The casing is provided with the port 9 for the admission of air when the valve 4 is opened and the plug is provided with a port 10 to correspond with the port 9 once during each revolution of the plug. The plug $a$ also has an exhaust port 11 which registers with an exhaust port 12 in the casing once during each revolution and the exhaust port 11 is arranged in such a position as to register with the port 12 before the opening 13 in the plug is clear of the opening 14 in the casing to the discharge pipe so that a considerable volume of compressed air or other fluid is allowed to escape after a discharge from the discharge pipe as well as from the interior of the plug thereby preventing the choking of the discharge pipe below the hollow plug owing to a cushion of compressed air having been left therein which also has the effect of preventing the free escape of the ashes or at least of allowing the escape of such ashes at irregular intervals only, besides which if the air be relieved from the interior of the plug or piston as the plug again opens to admit a fresh charge, the air escapes and momentarily drives the charge of ashes or the like in an upward direction instead of allowing them to fall freely into the interior of the plug. It is evident that if desired the discharge pipe may have a separate exhaust which is opened or actuated by a valve or otherwise, but having regard to the fact that it is necessary to exhaust the interior of the plug, piston or the like in order to prevent the rush of air upward when the inlet to the plug or the like is opened, it follows that it is more simple and convenient to allow of exhausting both parts of the apparatus at once than to make two separate operations. See Figs. 5 and 11. The said exhaust may take place into the atmosphere or suction may be actually applied to effect the exhausting if desired. The plug is suitably provided with a steel cutting piece or edge 15 and similarly one of the edges of the hopper or casing may be so provided.

Water is supplied to spray and lubricate the plug by a pipe 16 to a grid 17 or casing provided with a single narrow opening or as shown with a number of downwardly projecting passages or jets 18 and mounted in the shell or casing $b$. The taper plug $a$ is elastically pressed home into the taper casing $b$ by means of a helical spring 19 forming an elastic packing and arranged concentric with the stuffing box 20.

In order to prevent the spring 19 from jamming the plug or at least from causing it to be too tight in the casing, the latter is provided with an adjustable screw bearing $j$ fitted at the small end of the casing into which the gudgeon or short shaft on the end of the plug takes and this bearing is suitably provided with teeth on the periphery of its flange into which a worm or the like (not shown) gears, said worm being mounted in bearings on the casing and suitably turned by a hand wheel so that the position of the plug can be regulated to a nicety. If desired and as shown the said screw bearing is provided with a liner.

At each end of the casing $b$ there is a space between the ends of the plug $a$ and the casing both of which spaces are connected by pipes 120 and 121 or one space only may be connected to the oil supply while the other space is connected to the first space, the ends of the plug are also suitably so formed or shaped at 122 and 123 as to provide a greater space between its ends and the ends of the casing so that the circulation of the oil is promoted, that is, the oil is carried around with the plug as the latter revolves or the plug may be formed with small cup-shaped recesses or fins for the same purpose. It is also evident that the ends of a cylinder having a reciprocating piston of the kind described may also be supplied with lubricant in a similar manner in which case the two ends would be connected by a pipe of large diameter.

As shown in Fig. 6, the elastic packing or spring 19 is mounted in the stuffing box 20 on the casing $b$ the gland 21 pressing against the spring, the latter pressing against a metal washer 22 and the said washer pressing against a packing ring 23 which again presses against a collar 24 on the shaft or stem $x$ of the plug $a$. Or as shown in Fig. 7 the spring 19 is mounted so as to press at one end against the bearing 25 and at the other end against the sprocket wheel $y$ the said spring being if desired provided with a cylindrical case or covering 26. Or the spring may be mounted at the small end of the taper casing as shown in Fig. 8 in which the spring 19 presses against a screwed gland 27 which is provided with teeth 28 on its periphery, said teeth being adapted to gear with a worm or a pinion turned by a hand wheel (not shown) to permit of regulating the distance to which the plug $a$ may move longitudinally by means of the spring in the casing $b$. The small end of the plug is provided with a stem or extension 29 screwed at its end and provided with a nut 30 by which the amount of compression of the spring is adjusted and the ring 31 sliding on the stem 29, but being prevented from turning thereon by the feather 32, is interposed between the washer 33 and the nut 30 to prevent the nut from screwing or unscrewing during the revolution of the stem 29. The screwed gland 27 has a recess for packing 34 and a washer 35 is interposed between the packing and the spring 19. As in Fig. 7 the spring is shown provided with a cylindrical covering 26. Or according to another modification and as shown in Fig. 9, the plug $a$ is drawn up against the interior of the plug casing $b$ by means of the spring 19 which is contained in a hollow gudgeon or stem 36 which spring is compressed between the head of a spindle 37 and the inside end of the said gudgeon by means of a nut 38 on the spindle and a ring 39 sliding on a feather 40 which is in contact with a screwed gland 41. The stem 36 revolves in a flanged bearing or sleeve 42 in the gland 41, the flange of which gland is provided with teeth 28 on its periphery or the like adapted to gear with a pinion or a worm (not shown) to permit of regulating the position of the taper plug in the casing against the action of the spring. Or as shown in Fig. 10 the small end of the casing $b$ is provided with a tension spring 43 for pulling the plug $a$ up to its bearing in the casing. The spring is fixed or hooked to a disk 44 which rests in a recess at one end of the hollow stem of the plug $a$ and the other end of the spring is also similarly connected to a lug on a disk 45. The latter is attached to the plug $a$ by means of a screwed bush 46 which can be adjusted to give the required tension on the spring 43 suitable provision being made to prevent the spring from being twisted by relative rotation between the parts 44 and 45. The bush 46 is provided with teeth 47 and it is adjusted by a worm or pinion as aforesaid, not shown.

Fig. 11 illustrates the application of the means to relieve the fluid pressure in the discharge pipe and the space in the piston $a'$ simultaneously by providing a port 12' for the exhaust in the casing or cylinder $b'$ which is adapted to register with the space in the piston $a'$ just before the space therein is closed to the discharge port 14 on the return of the piston, it being understood that the space in the piston is open at the top and the bottom to register respectively with the compressed air opening 9' in the cylinder at the top and the discharge opening 14. 9 represents the port for the supply of pressure fluid which is connected to the valve for the intermittent supply of said pressure fluid. A spring 190 may also be employed to elastically compress the packing 48 for the piston rod 49 when in apparatus of this kind a piston $a'$ reciprocating in a cylinder $b'$ is employed instead of a plug in a casing.

Referring to Figs. 12, 13 and 14 the cock or valve of this modified form of apparatus is supplied periodically or at set times with compressed air or other fluid from an intermittently operated valve such as is described with reference to Figs. 1 to 5 through a port 9 in the casing $b$ and the latter is also provided as before with an exhaust port 12, while the plug $a$ is provided with a port 52 which registers alternately with the air inlet port 9 and exhaust port 12 in the casing $b$. Fig. 12 shows the plug with its opening 13 at the top ready to receive the charge of ashes or the like. Fig. 13 illustrates the position of the plug when beginning to discharge, that is with the opening 13 nearly registering with the opening 14 and the port 52 beginning to register with the port 9 and Fig. 14 shows the opening 13 in the plug only partly registering with the discharge orifice 14 in the casing and the port 52 establishing communication with the exhaust port 12 so that the pressure in the discharge pipe and the interior of the plug is simultaneously relieved before the plug reaches the position for the next charge, thus preventing the retention of a cushion of air or other pressure fluid in the discharge pipe and also obviating the puff of air, which would escape upward (carrying with it cinders or the like) when the opening 13 in the plug came opposite to the inlet for the ashes. Preferably the two ports 9 and 12 and the port 52 in the plug are arranged near the smaller end of the casing and plug respectively as the wear on the surface of the plug and casing is less at that end than that on the larger end owing to the slower peripheral speed and any fine grit which falls through the opening 13 on to the liner while the plug is revolving will not tend to score the plug so much as if the ports were in the large end.

Fig. 15 shows a tubular or hollow piston valve 53 adapted to be used instead of the mushroom valve for the intermittent supply of compressed fluid shown in Figs. 1, 2 and 3. In this construction the hollow piston valve 53 is provided with admission ports 54, a stem with a roller as before for the cam to operate, and the latter in its revolution lifts the hollow piston at the appointed time against the action of the spring 5 until the admission ports 54 register with the annular chamber 55 in the valve casing 56, which is connected to the pressure fluid supply pipe 3. The upper end of the hollow piston 53 is open and the upper end of the casing 56 connects by a pipe 57 or otherwise to the casing of the plug or its equivalent for receiving the charge of ashes.

Fig. 16 illustrates the construction in which the engine or other mechanism (not shown) drives a centrifugal pump for discharging the ashes and cinders by means of water. In this arrangement a centrifugal pump 58 is by a suction pipe 59 and sluice valve, indicated diagrammatically at 60, connected to the sea through the ship's side 61. The centrifugal pump is provided with two delivery pipes, the one marked $3'$ admitting water under pressure to the inlet port in the casing $b$ of the apparatus in a similar manner as shown in the constructions hereinbefore described and illustrated. A second and larger delivery pipe 62 from the pump admits water to the under-side of the casing $b$ just above the sluice or gate valve 63 and the water passing through this second delivery pipe produces a suction in the casing $b$ and then drives the charge of ashes into the sea through the valve 63 and discharge pipe 64 after the water under pressure through the delivery pipe $3'$ has emptied or completed the emptying of the contents of the plug into the casing $b$. It is evident that if desired an ordinary reciprocating or other suitable pump may be employed, in lieu of a centrifugal pump, to supply water at the necessary pressure to force the ashes or the like down the discharge pipe 64. The centrifugal pump is driven from a suitable source of power and the plug and crusher are conveniently driven by chain and sprocket wheels from the same source.

The valve indicated at 63 is used to close the pipe 64 when the apparatus is not in use or becomes accidentally disabled from any cause, to prevent the sea-water from backing in, and the valve $103^a$ in pipe $3'$ is for controlling the water passing through pipe $3'$. This last described apparatus forms the subject-matter of my Patent No. 963,649, dated July 5, 1910, granted on an application which was a division of this application.

Figs. 17 and 18 illustrate a construction of expeller provided with a hollow plug $a$ having a diametrically arranged partition 65 and with two oppositely arranged openings 13, made in the walls 66 of the casing each of which openings is shown contiguous on one side to the partition. The ends of the plug or the casing or both are so made, as described with reference to Fig. 4, as to form a space at each end between the plug and the casing and the said spaces are connected to a supply of oil, or one space may be so connected while the other space is connected to the first space. As in the constructions previously referred to and best seen in Figs. 1 to 4, the apparatus is provided with a hopper, means for crushing the clinker, a valve operated by means of two cams or the like, an inlet port 9 for the pressure fluid and a port 12 for the exhaust while the plug itself is provided with air and exhaust ports to correspond, that is to say there is a port 67 for one compartment and a port 68 for the other. In Fig. 17, the port 67 is registering with the port 9 for the inlet of the pressure fluid to the lower compartment while the upper compartment is open to receive a fresh charge of ashes, and Fig. 18 shows the wall 66 nearly closing the discharge opening 14 and the port 67 in the plug registering with the exhaust port 12 in the casing so that the pressure is relieved in the discharge pipe below the plug and in the interior of the plug itself, as two discharges are to take place during each revolution it follows that the air valve for admitting air periodically must be operated twice during each revolution, and for this purpose two cams such as marked 7 in Figs. 2 and 4 are mounted opposite to each other.

In order to prevent the hopper, the jaws of the crusher, the casing, the plug or other part of the apparatus from being broken in case a foreign body such as a piece of metal or other hard substance should be dropped into the hopper and become caught or jammed in a part of the apparatus, the latter is suitably provided as shown as an example in Figs. 19 and 20 with a breakable or shearing coupling part and means for entirely cutting off the supply of pressure fluid in the event of shearing taking place. The sprocket wheel $u$ on the cam shaft $m$ (which in this example is suitably mounted on the same end of the shaft as the sprocket wheel $v$) is provided with a cam 69 pivoted at one end to a screw or pin 70 fixed to the said wheel $u$, while the other end of said cam is normally held fast by means of a stud 71 mounted in a recess in a boss at the end of the cam impelled by a spring 72 which causes the stud to take into a shallow recess 73 in the wheel so as to prevent the displacement of the cam under normal conditions. There is also a similar but deeper recess or hole 74 at a short distance from the recess 73 and further from the axis of the wheel. The shearing pin 75 is preferably made taper and driven into a hole on a crank 76 (forming the shearing arm and keyed to the shaft $m$) and into the sprocket wheel $u$, which is loose on the shaft. If the shearing pin should be sheared intermediate of the shearing arm 76 and wheel $u$ the shaft $m$ stops so that neither the crusher nor plug move while the wheel $u$ continues to revolve and the pivoted cam 69 on the wheel immediately comes into contact with the shearing arm which is then stationary. The shearing arm then forces the cam to move outward so that its spring impelled stud 71 comes out of its normal resting place in the recess 73 and as the said cam continues its movement, the stud rides over the surface of the disk of the wheel until it registers with the hole 74 when its spring forces it into the said hole thereby locking the cam 69 in such a position that instead of being clear of all obstructions as it was before, and normally is, it now comes into contact, on the continued revolution of the wheel, with the upper end or laterally projecting arm of a hook-shaped tripping lever 77 (or other suitable device) fulcrumed at 78 to a bracket 79 fixed for example on the boss of the bearing $n$ for the cam shaft $m$ said bearing boss forming part of the hopper. If desired the said bracket 79 is provided with a guide for the hook-shaped tripping lever 77, formed by a downwardly projecting extension 80. The other or hooked end of this tripping lever 77 when struck by cam 69 comes out of engagement with a shackle or loop 81 pivoted or fixed to the end of the spindle 82 of a valve 83 which normally tends to close by means of a spring 84 (the said spring and valve being indicated in dotted lines in Fig. 20). The valve is mounted in a valve casing 85 arranged between the receiver of the compressor and the air inlet valve 2 to supply the plug with a charge of pressure fluid for expelling the ashes or the like whenever the roller on the end of the valve stem 6 comes into contact with the cam 7 on the sprocket wheel $y$. When the pin 75 is sheared and the tripping lever 77 releases the valve spindle shackle 81, disappearing within its guide bracket 79, 80, the shackle is quite clear of the hook of the lever 77 and the valve spindle 82 drops owing to the action of the spring 84 on the valve, the result of the whole operation being that pressure is maintained in the receiver of the compressor, thereby preventing the engine from racing and no material damage is sustained by the expeller itself. To render the apparatus again ready for use it is only necessary to stop the engine, to knock out the parts of the sheared pin 75, to insert a fresh one and to return the cam 69 to its normal position with its spring impelled stud in the shallow recess 73 in the sprocket wheel $u$. If desired the tripping lever 77 or other part (such as the cam 69) moved when a break-down or stoppage occurs is adapted to ring a bell or give any other mechanical or electrical aural or visual signal.

The construction shown in Figs. 21 and 22 is very similar except that the valve casing 86 is adapted to contain both the valve 4 for cutting off, and opening the supply of air or other pressure fluid periodically to the valve casing and the valve 83 for cutting off the supply of air entirely in case of the shearing pin 75 being sheared. The shape of the hook shaped tripping lever 77 its arrangement and its bracket are somewhat altered, that is to say the hook of the tripping lever is fixed on a long pin or pivot 87 mounted in bearings 88 on the bracket 79 fixed to hopper of the apparatus one of which bearings has formed in one therewith a bracket 89 with a hole therein through which the end of the hook normally protrudes, which bracket forms a stop to prevent the shackle 81 from following the hook when it is released. The other end of the pivot pin 87 is provided with an arm or lever 90, similar to the laterally projecting arm of the tripping lever shown in Fig. 19, and is adapted, as before, to be moved when the cam 69 is moved out of its path by the shearing arm 76 and is held in that position by the spring stud 71 taking into the hole or deep recess 74. The valve casing 86 as aforesaid contains both valves 4 and 83; the valve 4 is provided with a short stem at the top which is guided in a cylindrical hole in the valve 83 and the latter also has an annular recess adapted to take the comparatively weak spring 5. The said valve 4 is also provided as before with a stem 6 suitably guided in a lower cylindrical extension of the casing provided with a stuffing box to prevent leakage and the stem has a roller at the extreme end adapted to ride over the cam 7 on the wheel $y$ as it comes around. The valve 83 for entirely cutting off the supply of pressure fluid in case of accidents is provided with a strong spring 84 and its stem 82 is shown connected to the shackle 81 by a jointed rod 91, but a longer shackle would serve equally well. The upper end of the casing is also suitably provided with a stuffing box to make a tight fit around the valve stem or rod 82. The valve casing is provided with an inlet 92 and an outlet 93 and one seating 94 serves for both valves.

Referring to Fig. 23 which illustrates a valve which is adapted to close or tend to close when the pressure falls below a certain point as would be the case if the plug of the expeller stopped in such a position as to allow a clear blow-through for the pressure fluid from the receiver or other source of supply, it will be seen that the valve proper marked 95 forms the lower end of a piston which is appropriately provided with piston rings 96, 97 and works in the cylindrical part of the casing 98, there being a helical spring 99 which normally tends to close the valve on its seat 100, but when a certain predetermined pressure is exerted on the lower end of the piston, the valve is caused to rise into its casing against the action of the spring. In order to regulate the valve so that it shall close at the desired pressure, the top of the casing 98 is provided with a screw hole through which passes a screw 101 having a perforated disk or washer 102 adapted to come into contact with the top of the spring. There is a lock nut 103 to jam the screw in the desired position and the upper part of the casing is suitably provided with a small port 104 to prevent the accumulation of pressure fluid on the top of the piston which would tend to prevent it from working freely.

According to Figs. 24 to 26, the tripping lever 77 carried on the bracket 79 engages a catch 105 on a rod 106 pivotally connected with a lever 107 which in turn is pivotally connected with the stem 108 of a valve 109 in the duct 110 for the supply of pressure fluid to an engine or motor driving the pump which supplies the expeller. A spring 111 is always tending to close the valve 109 and therefore when the pin 75, connecting the crank 76 with the wheel $u$, is sheared, the cam 69 in riding over the crank 76 is moved outwardly, so that its spring operated stud 71 moves from the shallow recess 73 into the deep hole 74, and later on in the revolution knocks up the tail 90 of the tripping lever 77 so that the spring 111 is free to force up the stem 108 and valve 109, which latter thereupon stops the supply to the engine and the latter ceases to drive the pump.

It will thus be seen from the previous description that I provide a rotatable plug having a single receiving chamber for refuse, Figs. 1 to 5 and Figs. 12 to 14, or a plug having a plurality of receiving chambers operating to receive and to discharge alternately, Figs. 17 and 18, the circular walls of which chambers, or rather of the members in which they are located, operate as cut-off gates to prevent at all times the formation of a direct passage for sea water from the discharge or ejector pipe to the hopper $f$. Each of the chambers alternately receives ashes &c. from the hopper and delivers them to the ejector pipe. The charge drops by gravity, assisted or forced by a fluid jet. This fluid may be compressed air that not only forces the charge out of the chambers but also prevents the sea water from entering the chambers. When the ashes &c. are expelled by a liquid jet the sparging jet through the pipe 3 is effective to dislodge any refuse that has not fallen by gravity from the chamber or chambers and has been drawn to the jet or stream through the pipe 64. The jet through the discharge pipe or tube 64 gathers velocity as it passes through the pipe, and consequently increases the velocity of the refuse carried thereby.

What I claim and desire to secure by Letters Patent of the United States is:—

1. Apparatus for discharging ashes and other matter from ships comprising in combination a revoluble hollow plug, a casing inclosing and adapted to revolubly support said plug, a filling connection opening into said casing, a discharge connection opening into said casing, a supply port in said casing, a pressure fluid connection to said supply port, an exhaust port in said casing, an opening in said plug the path of travel of said opening intersecting said filling and discharge connections, and a second opening in said plug the path of travel of said second opening intersecting said supply and exhaust ports, said second opening being so disposed with relation to the first named opening and said ports and connections being so disposed with relation to one another that said second opening is registered with said supply port when the first named opening is registered with said discharge connection and is registered with said exhaust port intermediate successive registrations of the first named opening with said discharge and filling connections substantially as set forth.

2. Apparatus for discharging ashes and other matter from ships comprising in combination a revoluble taper hollow plug, a casing inclosing and adapted to revolubly support said plug, elastic means operative to move said taper plug against its seat in said casing, a filling connection opening into said casing, a discharge connection opening into said casing, a supply port in said casing, a pressure fluid connection to said supply port, an exhaust port in said casing, an opening in said plug the path of travel of said opening intersecting said filling and discharge connections, and a second opening in said plug the path of travel of said second opening intersecting said supply and exhaust ports, said second opening being so disposed with relation to the first named opening and said ports and connections being so disposed with relation to one another that said second opening is registered with said supply port when the first named opening is registered with said discharge connection and is registered with said exhaust port intermediate successive registrations of the first named opening with said discharge and filling connections substantially as set forth.

3. Apparatus for discharging ashes and other matter from ships comprising in combination a revoluble taper hollow plug, a casing inclosing and adapted to revolubly support said plug, elastic means operative to move said taper plug against its seat in said casing, an adjustable stop operative at the small end of said taper plug to limit the seating movement of said plug, a filling connection opening into said casing, a discharge connection opening into said casing, a supply port in said casing, a pressure fluid connection to said supply port, an exhaust port in said casing, an opening in said plug the path of travel of said opening intersecting said filling and discharge connections, and a second opening in said plug the path of travel of said second opening intersecting said supply and exhaust ports said second opening being so disposed with relation to the first named opening and said ports and connections being so disposed with relation to one another that said second opening is registered with said supply port when the first named opening is registered with said discharge connection and is registered with said exhaust port intermediate successive registrations of the first named opening with said discharge and filling connections substantially as set forth.

4. Apparatus for discharging ashes and other matter from ships comprising in combination a revoluble taper hollow plug, a casing inclosing and adapted to revolubly support said plug, elastic means operative to move said taper plug against its seat in said casing, an adjustment operative upon said elastic means to regulate the effort thereof on said plug, a filling connection opening into said casing, a discharge connection opening into said casing, a supply port in said casing, a pressure fluid connection to said supply port, an exhaust port in said casing, an opening in said plug the path of travel of said opening intersecting said filling and discharge connections, and a second opening in said plug the path of travel of said second opening intersecting said supply and exhaust ports said second opening being so disposed with relation to the first named opening and said ports and connections being so disposed with relation to one another that said second opening is registered with said supply port when the first named opening is registered with said discharge connection and is registered with said exhaust port intermediate successive registrations of the first named opening with said discharge and filling connections, substantially as set forth.

5. Apparatus for discharging ashes and other matter from ships comprising in combination a revoluble taper hollow plug, a casing inclosing and adapted to revolubly support said plug, elastic means operative to move said taper plug against its seat in said casing, a spray device directed on to the exterior surface of said plug, a pressure liquid supply connected to said spray device, a filling connection opening into said casing, a discharge connection opening into said casing, a supply port in said casing, a pressure fluid connection to said supply port, an exhaust port in said casing, an opening in said plug the path of travel of said opening intersecting said filling and discharge connections, and a second opening in said plug the path of travel of said second opening intersecting said supply and exhaust ports said second opening being so disposed with relation to the first named opening and said ports and connections being so disposed with relation to one another that said second opening is registered with said supply port when the first named opening is registered with said discharge connection and is registered with said exhaust port intermediate successive registrations of the first named opening with said discharge and filling connections substantially as set forth.

6. Apparatus for discharging ashes and other matter from ships comprising in combination a revoluble hollow plug, a plurality of isolated receptive cavities in said plug, a casing inclosing and adapted to revolubly support said plug, a filling connection opening into said casing, a discharge connection opening into said casing, a supply port in said casing, a pressure fluid connection to said supply port, an exhaust port in said casing, a plurality of openings in said plug each opening communicating with a separate cavity and the path of travel of said openings intersecting said filling and discharge connections, and a second plurality of openings in said plug each opening of said second plurality communicating with a separate cavity and the path of travel of these openings intersecting said supply and exhaust ports and each member of said second plurality of openings being so disposed with relation to the corresponding member of the first named plurality and said ports and connections being so disposed with relation to one another that members of said second plurality are registered with said supply port when corresponding members of the first plurality are registered with said discharge connection and are registered with said exhaust port intermediate the registrations of the corresponding members of the first plurality intermediate successive registrations of the first named opening with said discharge and filling connections, substantially as set forth.

7. Apparatus for discharging ashes and other matter from ships comprising in combination a revoluble taper hollow plug, a casing inclosing and adapted to revolubly support said plug, elastic means operative to move said taper plug against its seat in said casing, a pipe connection with each end of said casing, means for supplying lubricant to said pipe connections, means revoluble with said plug for distributing said lubricant, a filling connection opening into said casing, a discharge connection opening into said casing, a supply port in said casing, a pressure fluid connection to said supply port, an exhaust port in said casing, an opening in said plug the path of travel of said opening intersecting said filling and discharge connections, and a second opening in said plug the path of travel of said second opening intersecting said supply and exhaust ports, said second opening being so disposed with relation to the first named opening and said ports and connections being so disposed with relation to one another that said second opening is registered with said supply port when the first named opening is registered with said discharge connection and is registered with said exhaust port intermediate successive registrations of the first named opening with said discharge and filling connections, substantially as set forth.

8. Apparatus for discharging ashes and other matter from ships and other places comprising in combination a receptacle movable to alternately present its open mouth to filling and discharge connections, said filling connection, said discharge connection, a compressed fluid supply, an exhaust connection, means adapted to connect the interior of said receptacle with said supply during the period of presentation of its opening to said discharge connection, driving means for said receptacle, a limited power transmission coupling operatively connecting said driving means and said receptacle, said coupling being inoperative when its transmitting capacity is exceeded, means normally inoperative but adapted to stop said supply of compressed fluid, means in connection with said coupling adapted to render the last named means operative consequent upon the coupling becoming inoperative, and means adapted to connect the interior of said receptacle with said exhaust connection while said opening is passing from said discharge connection to said filling connection.

9. Apparatus for discharging ashes and other matter from ships and other places, comprising in combination a receptacle movable to alternately present its open mouth to filling and discharge connections, said filling connection, said discharge connection, a compressed fluid supply, an exhaust connection, means adapted to connect the interior of said receptacle with said supply during the period of presentation of its opening to said discharge connection, means operative upon reduction of pressure in said fluid supply to shut off said supply and means adapted to connect the interior of said receptacle with said exhaust connection while said opening is passing from said discharge connection to said filling connection.

10. Apparatus for discharging ashes and other matter from ships and other places, comprising in combination a receptacle movable to alternately present its open mouth to filling and discharge connections, said filling connection, said discharge connection, a compressed fluid supply, an exhaust connection, means adapted to connect the interior of said receptacle with said supply during the period of presentation of its opening to said discharge connection, a normally open valve in said compressed fluid supply, means operative to close said valve, a catch operative to hold said valve in the open position against the action of said closing means, driving means for said receptacle, a limited power transmission coupling operatively connecting said driving means and said receptacle said coupling being inoperative when its transmitting capacity is exceeded, a trip gear rendered operative consequent upon the failing of said coupling and operative to release said catch from said valve permitting the closing means to operate, and means adapted to connect the interior of said receptacle with said exhaust connection while said opening is passing from said discharge connection to said filling connection.

11. Apparatus for discharging ashes and other matter from ships and other places comprising in combination, a receptacle, a discharge duct, a hollow movable body intermediate said receptacle and said duct and operative to alternately receive matter from said receptacle and transfer it to said discharge duct, a compressed fluid supply, valves operated in consonance with said body to admit compressive fluid to said body at the time of said discharge, and means automatically operative upon the occurrence of danger conditions to stop said fluid supply.

In testimony whereof I have signed my name to this specification in the presence of two subscribing witnesses.

GAVIN CARLYLE RALSTON.

Witnesses:
 ALFRED NUTTING,
 PERCY PHILLIPPS.